United States Patent [19]

Neville

[11] 3,818,445

[45] June 18, 1974

[54] CHARACTER DATA SEARCH SYSTEM

[75] Inventor: Richard G. Neville, Endicott, N.Y.

[73] Assignee: International Business Machines Corporation, Armonk, N.Y.

[22] Filed: Dec. 18, 1972

[21] Appl. No.: 316,315

[52] U.S. Cl. ................ 340/146.3 H, 340/146.3 AH

[51] Int. Cl. ............................................ G06k 9/02

[58] Field of Search340/146.3 D, 146.3 H, 146.3 S, 340/146.3 Y, 146.3 AH

[56] References Cited

UNITED STATES PATENTS 3,587,047 6/1971 Cutaia ...................... 340/146.3 AH

*Primary Examiner*—Paul J. Henon
*Assistant Examiner*—Joseph M. Thesz, Jr.
*Attorney, Agent, or Firm*—Paul M. Brannen

[57] ABSTRACT

A character data search system which utilizes a plurality of small area scans which are located according to the probability that the field containing the desired information to be recognized is in a given location on the documents. Furthermore, the field is recognized by indicating key characteristics contained therein. The scanning of the field is of a multiple scan type and the scans may partially overlap each other depending upon the characteristics being searched for and the probability of finding the desired data in a given location. Also, for documents of varying size, the location of the scans may be made a function of document size.

5 Claims, 6 Drawing Figures

PATENTED JUN 18 1974 3,818,445

SHEET 1 OF 5

CHARACTER DATA SEARCH SYSTEM

FIELD OF THE INVENTION

This invention relates generally to character data search systems and in particular to character data search systems for determining characters which usually occupy a relatively small area on the document on which they are found.

DESCRIPTION OF THE PRIOR ART

Character data search systems which search for and locate data on unformatted documents, for presentation to a character recognition system, are known, in which the entire document is scanned and the entire resulting video pattern is stored for examination to locate the desired data. Such an approach is relatively slow, very expensive and requires processing of an enormous amount of data.

SUMMARY OF THE INVENTION

It is a principal object of the present invention to provide an improved character data search system.

Another object of this invention is to provide an improved character data search system which utilizes a plurality of small area scans.

A further object of this invention is to provide an improved character data search system where the search scans are arranged to partially overlap one another.

A further object of this invention is to provide an improved character data search system which employs partially overlapped search scans to ignore extraneous data which would interfere with finding the desired data field.

A further object of the invention is to provide a character data search system in which video data is stored in a suitable accumulator and is thereafter measured to determine if the height and location of a scanned character meet appropriate criteria.

Other objects of the invention and features of novelty and advantages thereof will become apparent from the detailed description to follow, taken in connection with the accompanying drawings.

In practicing the invention, a cathode ray tube scanner is governed so that a sequence of small area scans are taken at locations which are selected according to the probability that the information which is desired will be found at those locations. The video data is stored in a storage matrix from which it is supplied to a black data accumulator, which is arranged to provide a one dimensional profile of the video pattern. The data is shifted in the accumulator, and examined for pattern height and location. When conditions are met, a normalized rescan is started based on the data stored in counters relating to height, width and location of the character, and the video data thus obtained is supplied to the character recognition logic for analysis.

GENERAL DESCRIPTION OF THE DRAWINGS

In the drawings:

FIG. 1 is a highly schematic diagram of a character data search system embodying the presentinvention;

FIGS. 2*a*, 2*b*, 3*a* and 3*b* are schematic diagrams, in greater detail, of a system shown generally in FIG. 1.

FIG. 4 is a timing diagram illustrating the timing of the system.

Similar reference characters refer to similar parts in each of the several views.

DETAILED DESCRIPTION OF THE DRAWINGS

Figure 1:
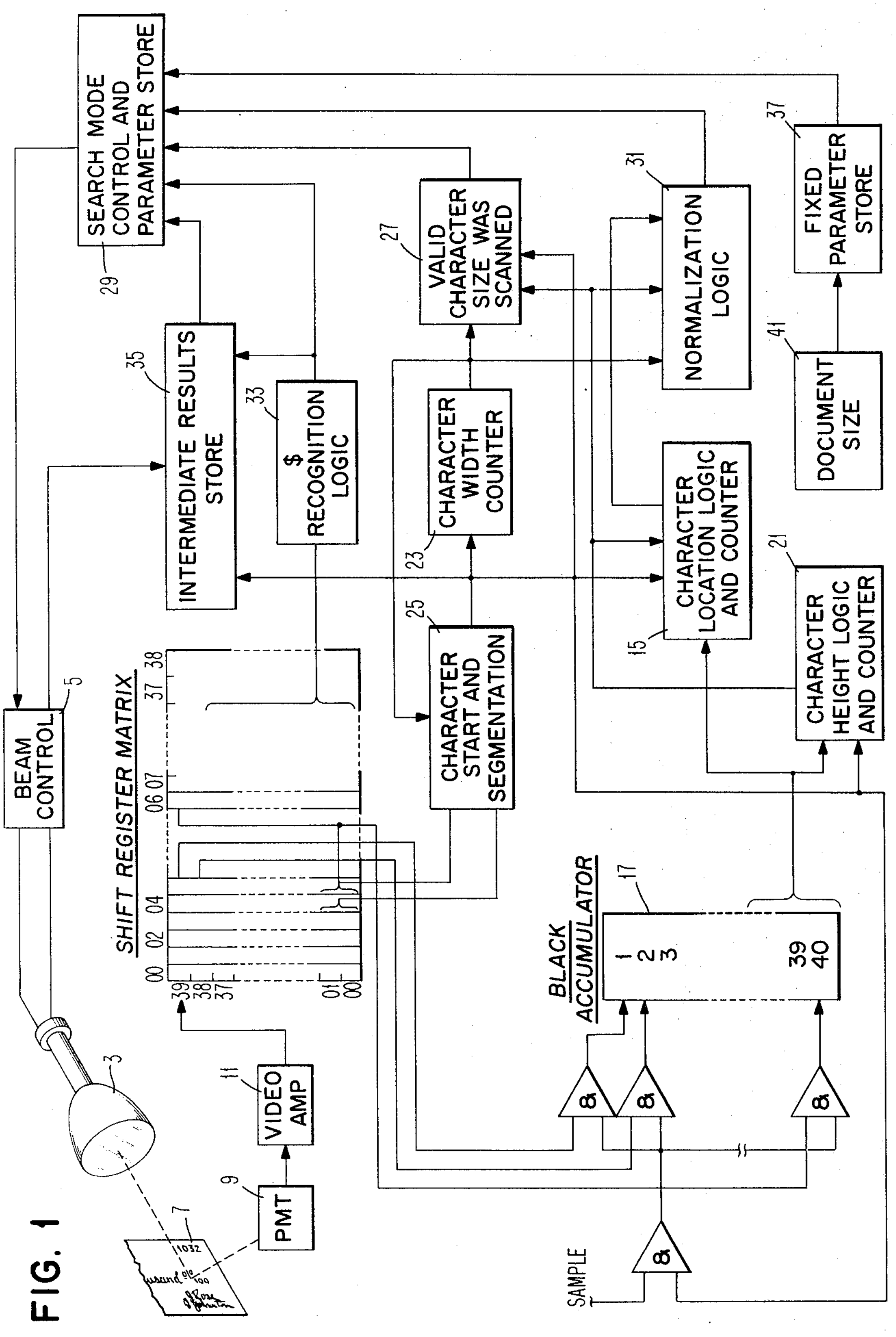

Referring now to FIG. 1 of the drawings, there is shown a basic data flow diagram of a system according to the present invention.

A cathode ray tube scanner 3 under the direction of beam control circuits 5 scans the documents such as 7 containing the information to be recognized and the resultant video scanning signals are supplied via the conventional photomultiplier tube 9 and associated video amplifier 11 to a shift matrix here indicated as having 39 vertical columns and 40 rows. The video information is shifted through the shift register matrix and is detected by character start logic circuitry 25, which monitors the portion of the pattern in the fifth and sixth columns, and upon detecting sufficient black information, initiates the transfer of pattern data into a black data accumulator 17. This action continues until appropriate segmentation logic detects the end of the character. The 40-position black data accumulator 17 is loaded in parallel from the sixth column of the shift register matrix once every 40 matrix advance pulses. By inhibiting the turn off of accumulator positions containing a black signal previously turned on as a result of black bits being in the matrix, a unidirectional profile of the video pattern passing through the matrix is obtained. After each parallel loading operation, via the AND circuits shown at the inputs of the black accumulator, the black accumulator is serially shifted down 40 times with the bits coming out the bottom re-entered at the top in a manner well-known in the art. As the black accumulator is shifted, the pattern or character height and location are determined by the character height logic and counter 21, as well as the character location logic and counter 15. Its logic circuitry is connected to the bottom positions of the black accumulator and supplies appropriate gates and impulses to the associated counter elements.

If a video pattern of less than a specified minimum height is detected, the height logic and counter unit 21 is immediately reset to zero and then starts to recount. This permits extraneous bits below a valid pattern to be ignored. Similarly, after a video signal of predetermined height is detected and a white space is found above it, further counting is inhibited to ignore extraneous bits. The character location logic, the character height logic, and counters 15 and 21 are reset at the beginning of each shift cycle of the black accumulator 17 to allow them to be updated by the new status of the black accumulator.

A character width counter 23 is provided and this counter is advanced once for each parallel load from the matrix to the black accumulator from the time of character start until segmentation occurs, as controlled by the character start and segmentation circuits 25.

In order to minimize the effect of extraneous data on segmentation, once a top of a video pattern, which is greater than the certain height, is detected, any additional black bits are ignored by the segmentation logic.

After segmentation, a decision is made on whether the pattern just detected is within the size tolerance or range which is permitted. If it is not, the entire system is reset and a new character start is searched for. If it is within range, a normalized rescan is initiated. Valid character size is determined by circuitry indicated generally at 27, which receives inputs from the character width counter, and from the character height logic and counter. An output from unit 27 provides one of the inputs to the search mode control and parameter circuits indicated generally at 29, which govern the beam control circuitry 5 to accommodate the various types of scanning operations desired. The normalized rescan is governed by operation of normalization logic 31 and the rescan parameters are based on the counts in the height, width and location counter circuits. The location counter is employed to reposition the beam to insure the desired character is within the normalization rescan. The normalized pattern obtained is shifted through the matrix and recognition by means of conventional combinatorial logic is attempted by recognition logic 33, connected to appropriate outputs from the shift register matrix. If a selected symbol is recognized, for example, a dollar sign on the document being scanned, the scan parameters employed at that time are stored in an intermediate result store 35, thus the coordinates of the precise vertical location and the left end of the amount field or other special field has been found. If the normalized character is not a dollar sign or any other selected symbol as desired, the search scanning is reinitiated and alternate scans and rescans will continue until the selected symbol is found or until a final rejection of the document is made.

The coordinates employed for the multiple search scans are stored in the fixed parameter store 37 and are based on the probability in finding the selective field in a given location, as previously described.

Document size is determined by appropriate means 41, which is not shown in detail, but might comprise, for example, a plurality of photo-electric sensors which provide outputs indicative of the size of the document being scanned.

Figure 2A:
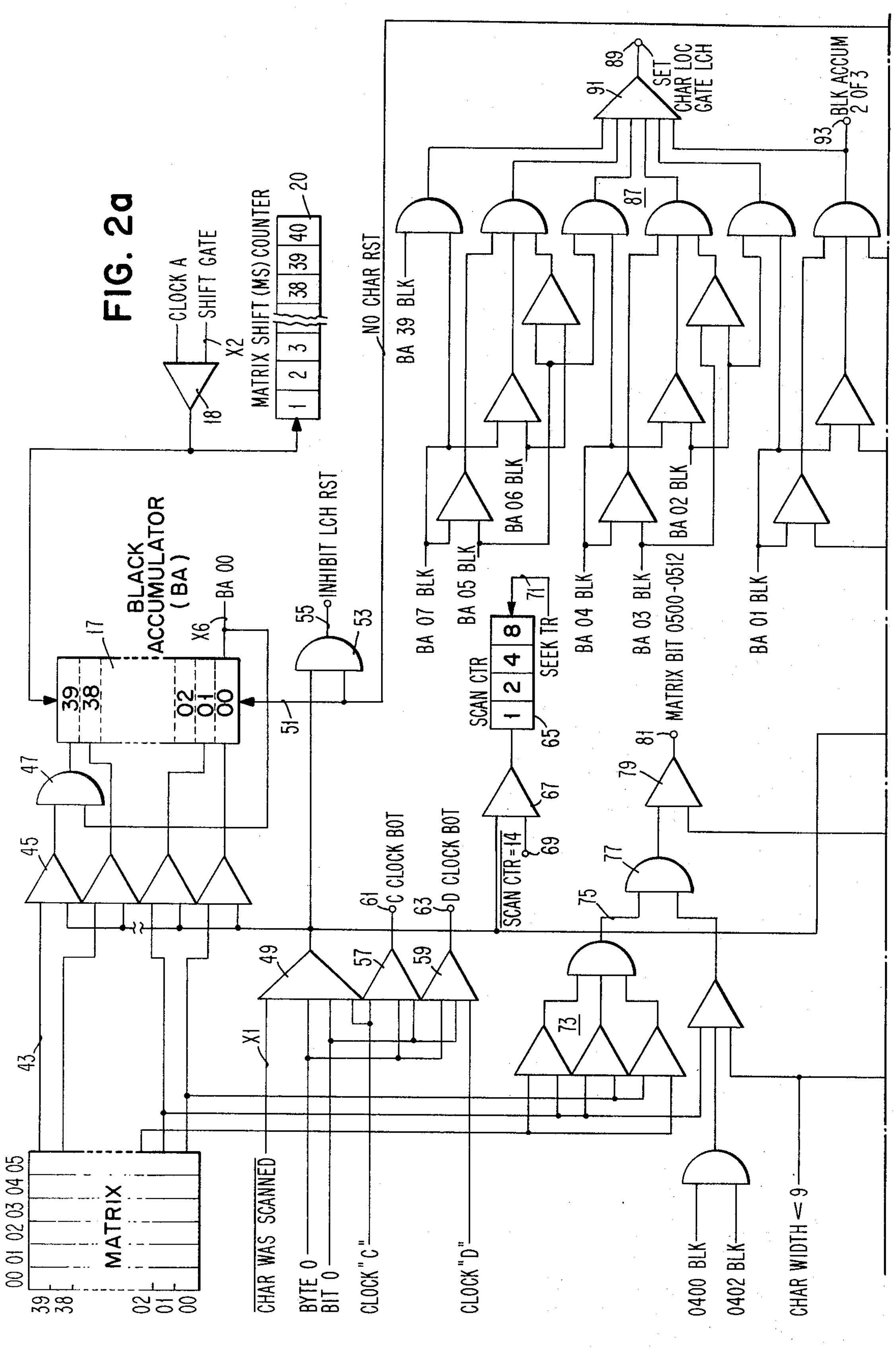
Figure 4:
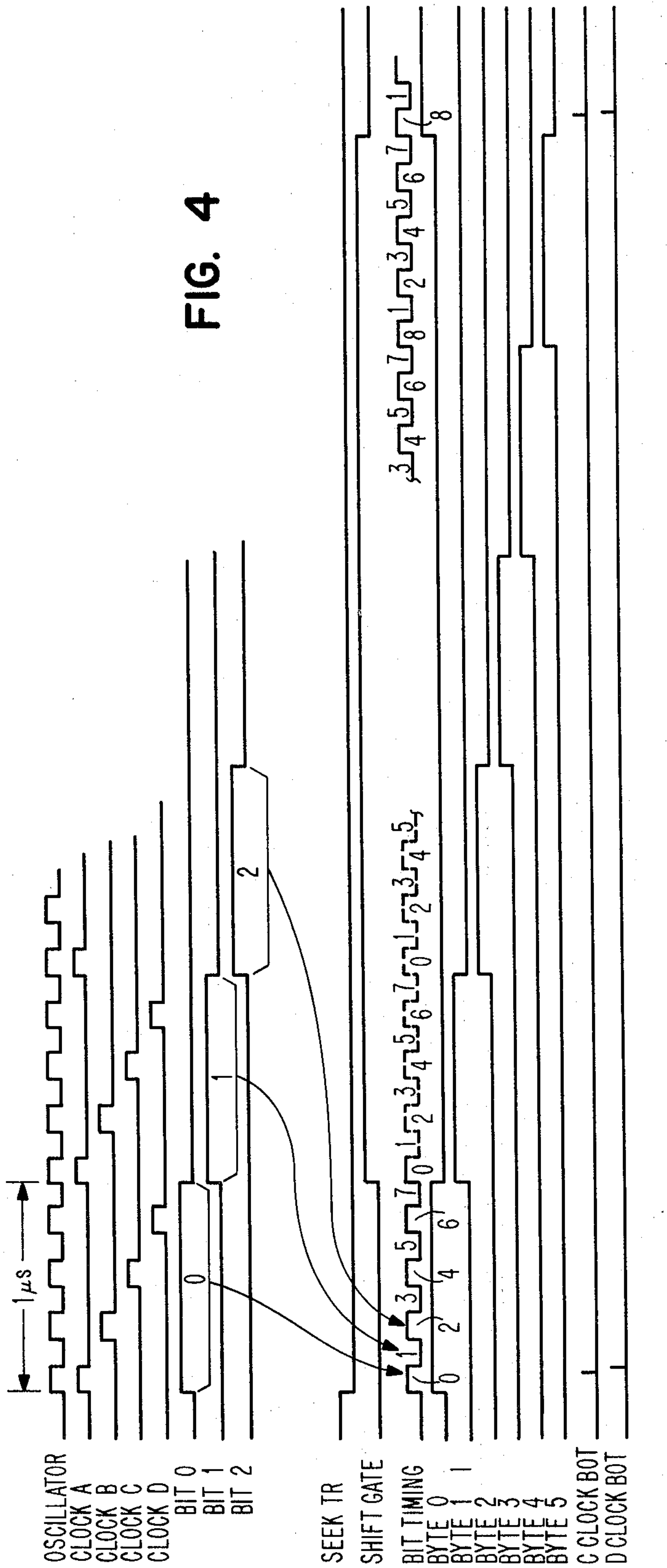

Referring to FIG. 2 of the drawings, there is shown a portion of the shift register matrix corresponding to that shown in FIG. 1, which is arranged to store the incoming video data resulting from scanning the character. The shift register may comprise six vertical columns and 40 horizontal rows as indicated to form a continuous shift register shown as a two-dimensional matrix in a manner well known in the art. Outputs from the shift register matrix are taken from selected positions in order to supply data to the black accumulator 17. Information is gated into the black accumulator from the last column of the storage matrix by a plurality of parallel lines such as line 43, governed by a plurality of AND gates such as 45 which is shown connected to the topmost position in the black accumulator via an OR circuit 47. The input AND gates for the black accumulator are governed by a signal supplied from an AND gate 49. The various inputs to AND circuit 49 constitute various timing and status signals which indicate that a character is being scanned and also that transfer of data to the black accumulator should occur once before each vertical trace of the beam at a time determined by the timing signal inputs. FIG. 4 shows the relationship of the timing signals.

Figure 3A:
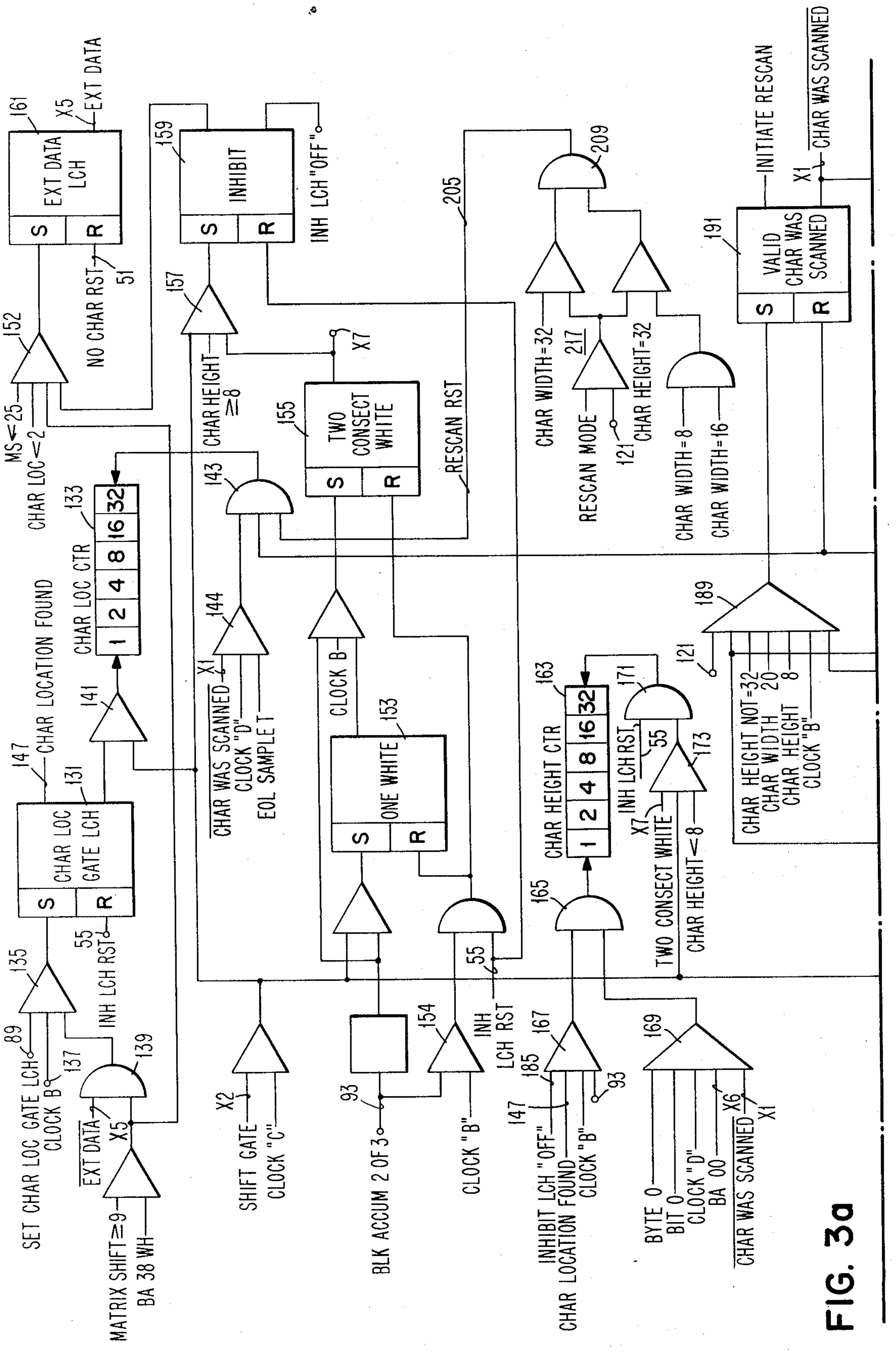
Figure 3B:
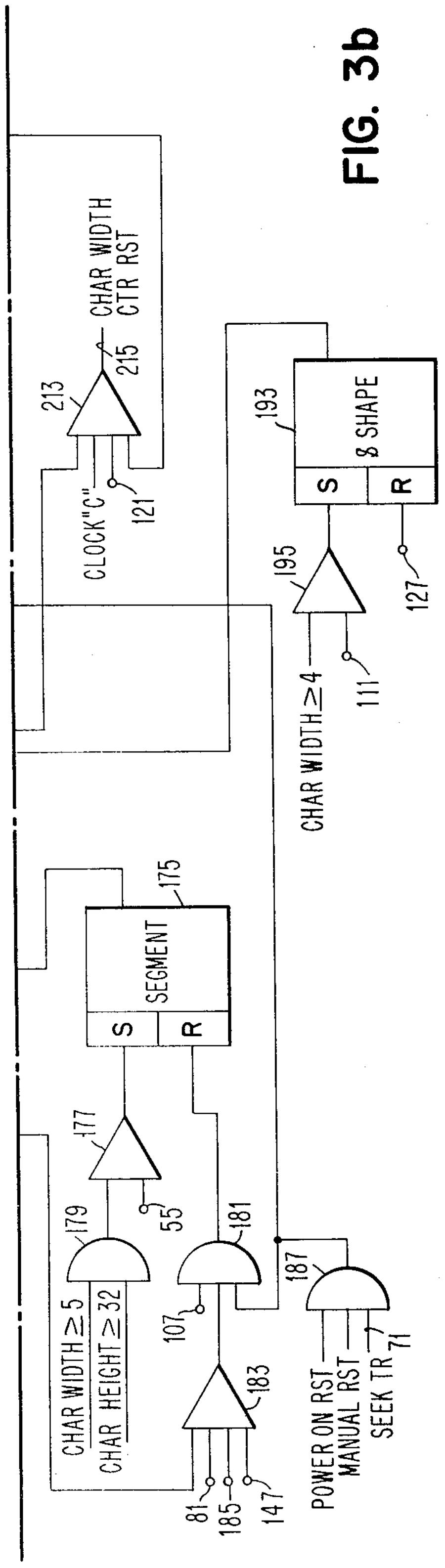

Whenever a new scan is to be initiated (e.g. when a new document enters the scan station), the CRT beam positioning parameters are gated from 29, FIG. 1, to beam control 5 and a seek trigger line 71, FIG. 3*b*. When the beam reaches the designated location, the seek trigger signal turns off, which starts the oscillator. The oscillator in turn controls the operation of three timing rings — clock, bit and byte, which may be of a conventional type.

Byte 0 time is employed to provide various sampling and reset pulses while the matrix is stationary, such as the loading of the black accumulator 17 described earlier; and provides the time required for the CRT beam to retrace to its starting location after a trace has been taken. At byte 1 bit 0 time, a vertical CRT trace starts. Shift gate also turns on at this time which provides, in conjunction with the timing rings, 40 pulses (byte 1 through byte 5) to sample into the shift matrix, and advance the shift matrix and the black accumulator. The OR circuit 47 is connected in such fashion that the data in the black accumulator can be recirculated since one input to OR 47 is connected to the bottom position in the accumulator. Data in the accumulator is shifted from top to bottom by the supply to accumulator 17 of advance pulses from AND circuit 18 indicated as an input by the arrow at the top of the accumulator. This AND circuit also provides advance pulses to the matrix shift (MS) counter 20 which counts the 40 pulses and which is used to provide gating signals to logic to be subsequently described. The black accumulator is reset by the supply of a signal thereto on a line 51 from reset circuitry to be subsequently described. The output of AND circuit 49 and the line 51 are also supplied as inputs to an OR circuit 53 to provide an inhibit latch reset signal on a line 55. The designations X1, X2, X3, etc., on various signal lines indicate common connections, e.g. all lines having a designation X1 are physically connected, and are utilized to avoid the complication of the logic diagrams which would result if the connections were actually drawn out. The AND circuits 57 and 59 have timing signals supplied thereto and provide signals on their respective output lines 61 and 63 designated "C Clock BOT" and "D Clock BOT" respectively. Scan counter 65 is a four-position binary counter of conventional nature and has an input signal supplied thereto from an AND circuit 67, the input being the output line from AND circuit 49 and the signal line designated as "not scan CRT equal to 14" on a line 69. The latter signal stops the counter from counting past 14 as counts higher than this value are not required and prevents the counter from overflowing. Counter 65 is advanced one count each time that data is transferred into the black accumulator 17. At this time it should be noted that the storage elements in the black accumulator 17 are such that they are set to an "on" condition by the supply thereto of information supplied from the matrix, but are not reset by the subsequent supply thereto of a signal indicating a lack of information. In other words, the storage positions in accumulator 17 will be set on by black data but will not be turned off by the supply thereto of subsequent white data. Scan counter 65 is reset by a signal on a line 71. A signal is supplied on line 71, the output from the seek trigger, to reset the scan counter at the time of starting each scanning sequence.

At 73 in the drawings, there is shown a combination of AND and OR circuits which provide an output when any two out of the three input lines supplying the combination have signals thereon. This two out of three signal is generated on a line 75 which is supplied as one input to OR circuit 77 in turn connected to an input of an AND circuit 79. Inputs are also supplied to the remaining portions of the logic including OR circuits 83 and 85, which have their inputs connected to the "on"

side of the matrix storage elements at the column locations designated by the first two numbers such as 04, and row locations designated by the last two numbers such as 11 or 12. The resultant output from AND circuit 79 is a signal on line 81 which indicates that black data is present at specified locations in the last two columns of the shift register matrix up to and including row 12.

The combination of AND and OR circuits shown at 87 is to provide an indication of the location of the character in the black accumulator and comprises a plurality of two out of three circuits, as well as a plurality of circuits indicating the presence of black data in either one of two adjacent positions. When the appropriate conditions are fulfilled, the output 89 of AND circuit 91 will provide a signal for use in connection with the character location counter circuitry. An additional output on terminal 91 also provides a two out of three output signal for the bottommost rows 00 and 01 as well as the topmost row 39 since row 00 and row 39 are logically adjacent in view of the wraparound circuitry including OR circuit 47.

Figure 2B:
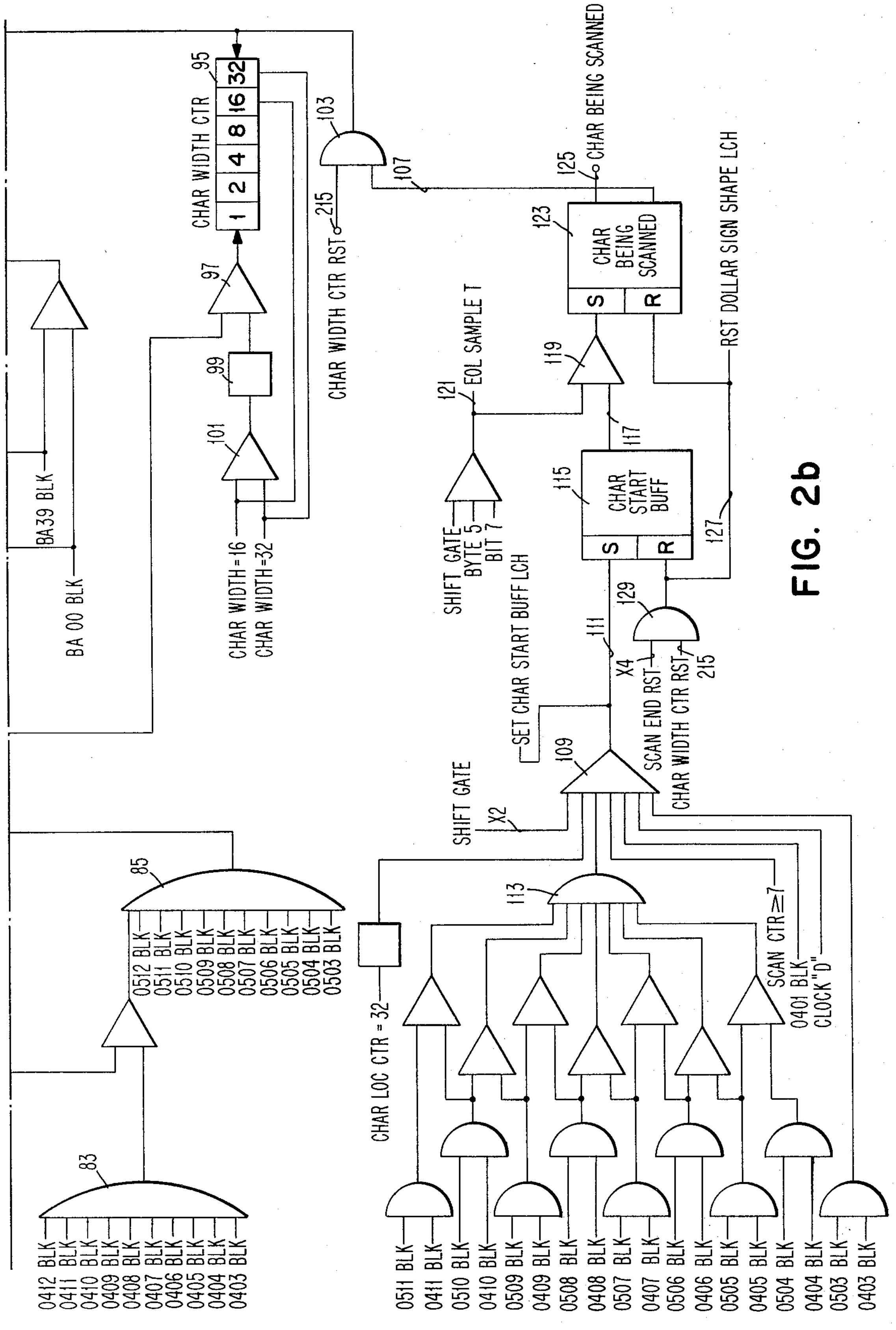

The character width counter 95, FIG. 2*b*, is a conventional binary counter having six positions, the input of which is supplied from an AND circuit 97, one input thereto being the beginning of trace sample signal from AND circuit 49 and the other input being an inhibit signal supplied from an inverter 99 connected to the output of an AND circuit 101, the inputs of which are connected to the last two positions in the counter so that the counter is prevented from overflowing. The character width counter is reset by the output of an OR circuit 103, the inputs of which are a signal designated as "character width counter reset" on a line 215 and a signal designated as "character not being scanned" on a line 107. The latter signal holds the width counter reset until the start of a character has been detected, which is to be subsequently described. AND circuit 109 provides an output signal which is indicative that conditions are proper to set the character start buffer latch on a line 111. One of the inputs to AND circuit 109 is from an OR circuit 113, the inputs of which comprise a plurality of OR and AND circuits which define the presence of black data at locations in columns 4 and 5 which is indicative of positions of black data being present to show that an edge of a character is involved. The remaining inputs to AND circuit 109 require the presence of black data at specific locations such as column 4 and row 1, and column 4, row 00, or column 5, row 00, plus suitable clock signals and signals indicating the status of the scan and character location counters. When a signal is supplied to the line 111, the character start buffer latch 115 will be set on. The output from the character start buffer latch 115 is supplied via a line 117 to one input of an AND circuit 119, the other input of which is a signal on a line 121 which is generated by appropriate timing pulses. A signal is thus generated which sets the latch 123 on, this latch being designated "character being scanned." The output from latch 23 comprises line 125 designated "character being scanned" and the line 107, "character not being scanned." Latch 123 being on removes the reset from the black accumulator 17 by means of line 107, and OR 103, allowing it to begin accumulating the character pattern. Latches 115 and 123 are both reset by signals on a line 127 supplied from an OR circuit 129, the inputs thereto being signals designated "character width counter reset" 215 and "scan end reset" X4. The character location gate latch 131, FIG. 3*a*, which has, as its principal function, the control of a character location counter 133, is governed by input signals supplied to an AND circuit 135. The function of this circuitry is to indicate the location of the bottom of a character.

The location of the character is employed to properly reposition the vertical location of the CRT beam if a normalized rescan, of the character just detected, is to be taken. The character location gate latch 131 is initially in a reset condition (line 55) allowing advance pulses from AND 141 to advance the character location counter 133. Latch 131 is turned on when sufficient black bits are detected (line 89) in the black accumulator 17 indicative of a character being detected; extraneous data (noise) has not been detected, and a suitable timing pulse is supplied. With latch 131 turned on, any further advance of the location counter is prevented. Extraneous data is detected by latch 161 and the other leg of OR 139. Reset of the character location counter is controlled by OR 143. It is normally reset at the end of each black accumulator advance cycle by AND 144 unless a character was scanned ($\overline{\text{char was scanned}}$). It may also be reset by Rescan Rst of the initializing signals shown. Referring now to the logic that governs the operation of inhibit latch 159, a first latch 153 is designated as "one white" and a latch 155 is designated as "two consecutive white." The inputs to these latches are such that latch 153 will be turned on to indicate a condition in which there are no adjacent black bits in the black accumulator and in turn this latch will set the latch 155 on if this condition is detected a second time after the black accumulator is advanced once. Otherwise, the one white latch will be reset by AND 154. The output of latch 155 is supplied via AND gate 157 to set on an inhibit latch 159. The others inputs to AND circuit 157 include a suitable timing signal and an indication that the character is at least a certain height as indicated by an output from the character height counter. The inhibit latch turning on indicates that a black pattern at least 8 units high with white above it has been detected and is used to inhibit further advance of the character location counter and the character height counter 163 as any additional black bits most likely are due to extraneous data. The output of inhibit latch 159 is another input to AND circuit 152, the remaining inputs to 152 comprising a signal indicating the number of matrix shift pulses that have occurred and a signal designating the character location.

The output of AND circuit 152 is utilized to turn on an extraneous data latch 161, which is reset by the signal "no character reset" supplied as the output of OR circuit 103. Latch 153 and 155 now are reset by the inhibit latch reset signal on line 55 or by a combination of a matrix advance bit signal and a signal on line 93. The inhibit latch is reset directly by the signal on inhibit latch reset 55.

The character height counter 163 is a conventional six position counter having its input connected to the output of an OR circuit 165, in turn connected to the outputs of AND circuits 167 and 169. AND circuit 167 is effective to advance the character height counter when conditions are such that the bottom of the character has been found (147), black continues to be detected in the black accumulator, line 93, the inhibit latch is off, 185, plus a suitable clock pulse. AND gate 169 has a plurality of inputs providing suitable timing as well as the presence of black data in a particular location of the black accumulator. Since the inputs to the AND circuit 167 will not always take into account the condition of the bottommost storage position in the black accumulator, the additional circuitry provided to AND circuit 169 will examine the conditions in the lowermost black accumulator storage and account for that in operating the character height counter 163. This counter is reset by the output of an OR circuit 171, one input of which is supplied from an AND circuit 173. The inhibit latch reset line 55 provides one input to the OR circuit 171 and the inputs to AND circuit 173 will cause reset of the counter under conditions where extraneous data is found rather than a bonafide character.

Segmentation latch 175 is set on by the output of an AND circuit 177, one input of which is the line 55 "inhibit latch reset," and the other input of which is the output of an OR circuit 179, which has inputs indicating character width counts equal to or greater than 5 or character height count equal to or greater than 32. It is desired to allow segmentation to take place whenever a character height of 32 or more is detected since this is indicative of a large piece of extraneous data. Subsequent circuitry (191) will ignore this data and allow the search for a valid character to continue. The reset of latch 175 is provided by the output of an OR circuit 181, one input of which is the signal "character not being scanned" on a line 107. Another input to the OR circuit 181 is the output of an AND circuit 183, the inputs of which include the timing signals, the signals on line 81, 185, which prevents extraneous data from affecting the decision to segment, and 147, which prevents segmentation from occurring until the character location has been determined. A third input to OR circuit 181 is the output of an OR circuit 187, which has as inputs a number of initial or start-up conditions. The output of segmentation latch 175 is one of the inputs to an AND circuit 189, which governs the setting of a latch 191 designated "character was scanned." An additional input to AND circuit 189 is the output of a latch 193, designated "dollar sign shape." This latch is set on by the output of an AND circuit 195, the inputs of which are a count in the character width counter greater than or equal to 4, and a signal on line 111, and this latch is reset by a signal on the line 127. The remaining inputs to AND circuit 189 are additional signals which indicate that the character data meets minimum standards for recognizable characters in order to turn on the "character was scanned" latch. With latch 191 turned on, the output therefrom is employed to initiate a normalized rescan of the pattern detected. The output of segment latch 175 on line 176 is supplied to the input of an AND circuit 213 where it is combined with a timing signal, the signal on the line 121, and the off output of "character was scanned" latch 191 to provide an output on line 215 designated "character width counter reset." This signal 215 is indicative that a segment condition was detected but the character did not meet the criteria for valid character was scanned. This results in resetting the necessary circuitry and allowing the search for a valid character to continue.

The digital output signals from the character height, width and location counters are used during this rescan to supply conventional digital-to-analog conversion circuits in the beam control circuitry, to thereby position the CRT scanner beam at the most effective location and with the most effective normalization parameters for obtaining optimum data for recognizing the characters.

The circuitry indicated generally by 217 is employed to stop the normalized rescan if the normalized pattern exceeds the expected size.

From the foregoing, it is apparent that the present invention provides a unique approach to locating pertinent data on a character-bearing document, so that subsequent scanning for character information is greatly expedited.

While the invention has been particularly shown and described with reference to a preferred embodiment thereof, it will be understood by those skilled in the art that various changes in form and details may be made therein without departing from the spirit and scope of the invention.

I claim:

1. A character data search system for use with a character recognition system, comprising, in combination, scanning means for scanning documents and generating video data in response to scanning characters on said documents, video data matrix storage means comprising a plurality of rows and columns of storage elements, connected to said scanning means to receive said video data and store it therein in spatial relationship duplicating the actual form of the scanned characters, fixed parameter storage means connected to said scanning means and effective to control said scanning means to execute a plurality of relatively small area scans in those areas of a document where there is a high probability of locating the characters which are to be recognized, a black data accumulator having a plurality of storage locations, means connecting said storage locations to a selected column of elements in said matrix storage means to periodically receive video data therefrom in parallel, data shifting control means connected to said black data accumulator for shifting the data therein serially through said accumulator and returning the data shifted out of one end of said accumulator as inputs to the other end of said accumulator, character width counter means connected to said matrix storage means for counting video data relative to the width of the scanned character, height logic and counter means connected to selected end locations of said black data accumulator for determining the height of a scanned character, character location logic and counter means connected to said selected end locations of said black data accumulator for determining the location of a scanned character, and scan control means connected to the outputs of all of said counter means and to said scanning means to alter the scanning pattern in accordance with selected outputs of said counter means.

2. A character data search system as claimed in claim 1, in which said black data accumulator comprises a shift register including a plurality of serially connected elements and having parallel inputs, and having a serial output connected to a serial input to provide circulation of the data in said register, said shift register being constructed and arranged to inhibit the turn off of accumulator positions once they have been turned on as a result of the presence of video data in the corresponding position in the storage matrix.

3. A character data search system as claimed in claim 1, further including document size detection means connected to said fixed parameter storage means for altering the location of said small area scans in accordance with the size of the documents.

4. A character data search system as claimed in claim 1, further including segmentation means connected to said matrix storage means and to said counter means for stopping said counter means when the end of a character is detected.

5. A character data search system for use with a character recognition system comprising, in combination, scanning means for scanning documents and developing video data in response to scanning characters on said documents, video data matrix storage means connected to said scanning means to receive said video data and store it therein in two-dimensional form duplicating the actual form of the scanned characters, fixed parameter storage means connected to said scanning means and effective to control said scanning means to execute a plurality of relatively small area scans in those areas of a document where there is a high probability of locating the characters which are to be recognized, a black data accumulator connected to selected vertical positions in said matrix storage means for periodically receiving black data signals from said selected positions, with respect to vertical positions in said matrix, data shifting means connected to said black data accumulator for shifting said data serially and vertically in said accumulator, and returning the data shifted out of one end of said accumulator as inputs to the other end of said accumulator, counter means connected to selected positions of said accumulator for counting black data as it is shifted out of said accumulator, said counter means including a character width counter which is connected to respond to the loading of said accumulator from said matrix storage means, said width counter also having an output connected to said scanning means for altering the scanning pattern, and scan control means connected to said counter means and said scanning means for altering the scanning pattern in accordance with selected outputs from said counter means.

* * * * *